United States Patent
Gabas et al.

(10) Patent No.: US 6,357,826 B1
(45) Date of Patent: Mar. 19, 2002

(54) HEIGHT ADJUSTABLE SPINE SUPPORT

(75) Inventors: Carlos Gabas, Barcelona (ES); Rui Antionio Cruz de Pinho, Maia Codex (PT)

(73) Assignee: Fico Cables, S.A., Barcelona (ES)

( * ) Notice: Subject to any disclaimer, the term of this patent is extended or adjusted under 35 U.S.C. 154(b) by 0 days.

(21) Appl. No.: 09/719,732
(22) PCT Filed: Jun. 9, 1999
(86) PCT No.: PCT/EP99/03972
 § 371 Date: Mar. 2, 2001
 § 102(e) Date: Mar. 2, 2001
(87) PCT Pub. No.: WO99/65730
 PCT Pub. Date: Dec. 23, 1999

(30) Foreign Application Priority Data

Jun. 15, 1998 (DE) .......................................... 198 26 597
Oct. 30, 1998 (DE) .......................................... 198 50 121

(51) Int. Cl.$^7$ ................................................ B60N 2/66
(52) U.S. Cl. ................................ 297/284.4; 297/284.7; 74/502.4; 74/502.6
(58) Field of Search .......................... 297/284.4, 284.7; 74/502.4, 502.6

(56) References Cited

U.S. PATENT DOCUMENTS

| | | | |
|---|---|---|---|
| 5,197,780 A | * 3/1993 | Coughlin | 297/284.7 |
| 5,217,278 A | * 6/1993 | Harrison et al. | 297/284.7 |
| 5,449,219 A | * 9/1995 | Hay et al. | 297/284.7 X |
| 6,053,064 A | * 4/2000 | Gowing et al. | 74/502.4 X |
| 6,152,531 A | * 11/2000 | Deceuninck | 297/284.4 |

FOREIGN PATENT DOCUMENTS

| | | |
|---|---|---|
| AT | 396 734 B | 11/1993 |
| AT | 401 497 B | 9/1996 |
| DE | 28 56 784 A1 | 7/1979 |
| DE | 42 20 995 A1 | 1/1994 |
| DE | 42 32 679 C1 | 2/1994 |
| DE | 43 14 325 A1 | 11/1994 |
| EP | 0 107 627 A1 | 5/1984 |
| EP | 0 322 535 A1 | 7/1989 |
| EP | 0 552 904 A1 | 7/1993 |

* cited by examiner

*Primary Examiner*—Peter R. Brown
(74) *Attorney, Agent, or Firm*—Renner, Otto, Boisselle & Sklar, LLP

(57) ABSTRACT

A spine support comprises at least one bending element (20, 20') a plurality of supporting elements (30) essentially orthogonal arranged to the at least one bending element (20) and connected with it; and a first operating element (40, 40') arranged such that its operation leads to a bending of the at least one bending element (20). Two pairs of bowden cables (40, 60) for adjusting the spine support are operated by a control unit (90) comprising two coaxially arranged axles (91, 92). Preferably on at least one of the axles (91, 92) a receiver (96) for the inner steel cables of one of the two pairs of bowden cables and a receptacle (97) for the corresponding covers of the bowden cables are provided. The receiver (96) and the receptacle (97) approach each other or move away from each other under a rotation of the axle, depending on the direction of the rotation. The relative movement of the receiver (96) and the receptacle (97) is preferably achieved by the use of left-handed and right-handed threads on the axle.

12 Claims, 6 Drawing Sheets

HEIGHT ADJUSTABLE SPINE SUPPORT

TECHNICAL FIELD

Figure 1:
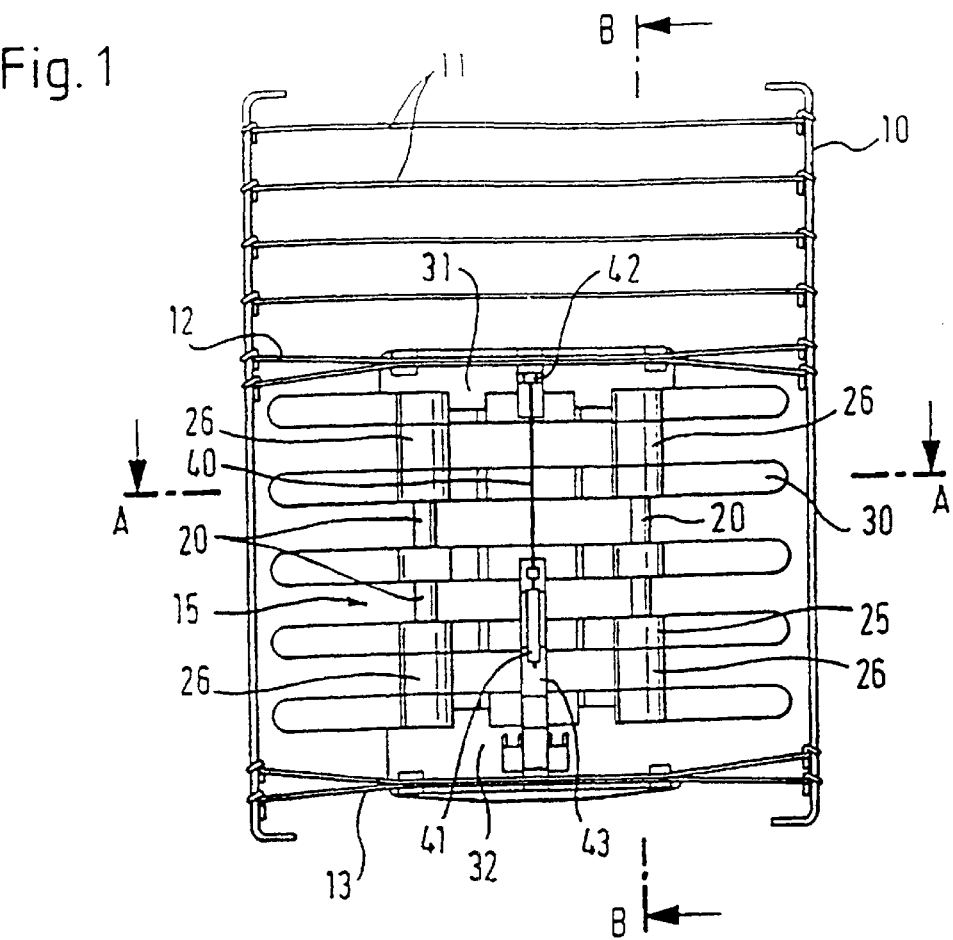

The present invention relates to a height adjustable spine support, in particular for a seat of a car.

THE PRIOR ART

Spine supports in seats serve for the anatomical support of the spine of a person sitting on the seat. To this end an arch is provided in the lower part of the backrest of the seat supporting the vertebrae of the spine in the area of the loins. Such supports are particularly used in seats which have to meet high standards with respect to comfort and ergonomics, since they are continuously used over a long time, as for example the seats of a car or in an office. Since the anatomy of each individual person is different, it is necessary to provide an adjustable spine support to adapt the shape of the spine support to the respective user. For a sufficient adjustment the spine support has also to be height adjustable, i.e. the vertical position of the arch in the backrest should be adjustable.

Adjustable spine supports according to the prior art (cf. FIG. 10) comprise typically an adjusting device 115 suspended in the lower part of a frame 110. The adjusting device 115 comprises a sheet-like plastic piece 120 and a bowden cable 140 extending along the center of the sheet-like plastic piece 120. By operating the bowden cable the plastic piece can be adjustably brought into an arched shape. If the frame 110 is together with the adjusting device 115 arranged below the cushioning in the backrest of the seat, the arch of the plastic piece leads to the desired shape of the backrest of. With the tongues 130, extending sideways from the sheet-like plastic piece 120, it is intended to extend the arch also to the outer parts on the side of the seat.

However, to bring the sheet-like plastic piece 120 into the desired arched shape, it has to be sufficiently flexible. Since the bowden cable 140 for the adjustment engages only the center part of the plastic piece 120, the high flexibility leads to an instable arch in the outer parts of the seat which cannot be properly adjusted. Further, the mentioned tongues 130 of the sheet-like plastic piece 120 do not provide a reliable shape on the sides of the backrest. The desired anatomical adaptation is therefore only obtained in the center part of the backrest.

Further examples of known spine support are disclosed in the AT 396 734. This document discloses a multitude of different constructions consisting of a flexible framework made out of flat vertical and horizontal laths. Similar spine supports are also disclosed in the DE 42 20 995 and the DE 43 14 325. The latter document further relates to an electrical drive for operating the bowden cable, which adjusts the spine support. The electrical drive comprises an electric motor and a rather complicated mechanism to transform the rotations of the motor in a pulling action of the bowden cable.

The constant flexibility in vertical direction of the sheet-like plastic piece 120 or the vertical laths in the spine supports according to the mentioned documents provides an arch with the shape of a segment of a circle having an adjustable but constant radius of curvature over the complete segment of the circle. A detailed adaptation for supporting the vertebrae of the spine, however, requires a more complex shape where the radius of curvature changes over the arch.

Finally, the high mechanical stress a car seat is subjected to, leads after some time to the plastic piece 120 or the vertical laths in the spine supports according to the mentioned documents becoming brittle and fragile. This poses especially in case of an accident a considerable risk, since broken laths might pierce the cushioning of the seat and injure the back of the person on the seat.

It is therefore the problem of the present invention to provide a simple and long lasting spine support having an arch extending continuously over the complete width of the backrest of the seat. Preferably a spine support is provided according to the present invention allowing an optimal adaptation to the shape of the spine by different radii of curvature of the arch in vertical direction.

According to a further aspect of the present invention, a simple but reliable control unit is to be provided to easily adjust the shape and the height of the spine support.

SUMMARY OF THE INVENTION

The present invention relates to an adjustable spine support, in particular for the use in a car seat with at least one bending element, a plurality of supporting elements which are essentially orthogonally arranged to the at least one bending element and connected with it, and a first operating element arranged so that its operation causes a bending of the at least one bending element.

The provision of separate bending and supporting elements allows by the selection of a suitable stiffness of the at least one bending element an optimal adaptation of the complete backrest to the vertebrae in the lower part of the spine. The supporting elements which are essentially orthogonally to the bending element arranged extend the shape the of the bending element over the complete width of the backrest and thereby assure also in the outer parts of the seat the desired shape of the backrest.

According to a preferred embodiment, the at least one bending element of the spine support comprises a coil spring. The coil spring provides on the one hand a sufficient support and on the other hand a sufficient flexibility also in the bent shape so that it can yield under excessive strain. Such an excessive strain may for example arise in a car seat, if the car drives through a pothole. In case of an accident the coil spring might be overstressed and permanently deformed. However, in contrast to the vertical laths of the prior art, it will not break, so that the risk of injuries for the person sitting on the seat is reduced.

Preferably, the spine support comprises two vertical bending elements extending in parallel and the plurality of supporting elements consists of lath-like elements connected with the two bending elements to form a flexible framework. Preferably, reinforcing elements are arranged around the bending elements to influence the bent shape of the bending elements. According to another embodiment, the two bending elements are not parallel but have a different distance in the center of the spine support than at its ends.

According to a further preferred embodiment, the bending elements and the lath-like elements are height adjustably arranged in a frame for a vertical adjustment of the spine support. The bending elements and the lath-like elements are preferably by at least one sliding block height adjustably suspended in the frame and can be upwardly and downwardly moved with a second operating element. The first and the second operating elements preferably each comprise a pair of bowden cables.

According to a preferred embodiment, the two pairs of bowden cables are operated by a control unit comprising two coaxially arranged axles. Preferably on at least one of the axles a receiver for the inner steel cables of one of the two pairs of bowden cables and a receptacle for the corresponding covers of the bowden cables are provided. In the preferred embodiment the receiver and the receptacle approach each other or move away from each other under a rotation of the axle, depending on the direction of the rotation. The relative movement of the receiver and the receptacle is preferably achieved by the use of left-handed and right-handed threads on the axle.

Further developments of the invention are the subject matter of the dependent claims.

SHORT DESCRIPTION OF THE DRAWING

Figure 2:
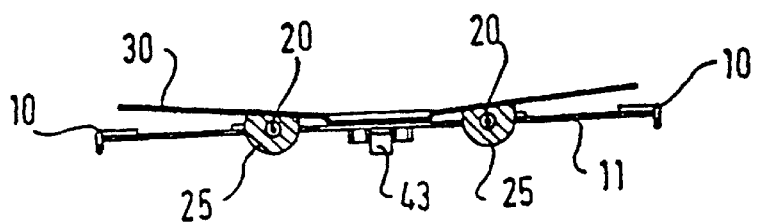
Figure 3:
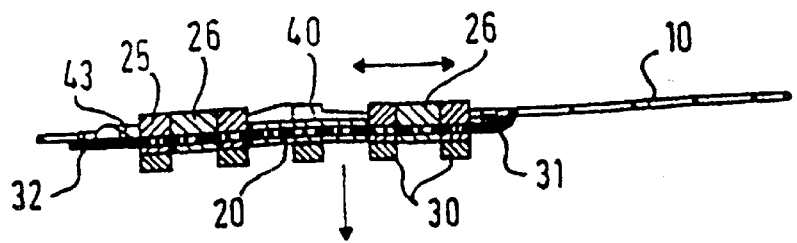
Figure 4:
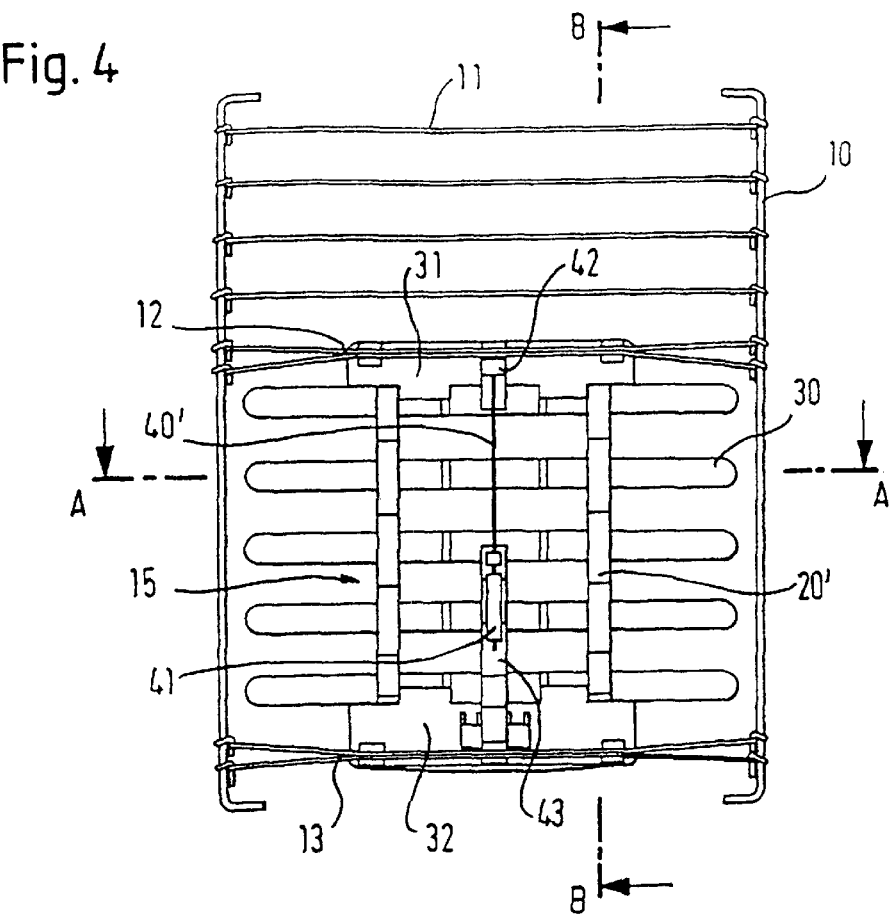
Figure 5:
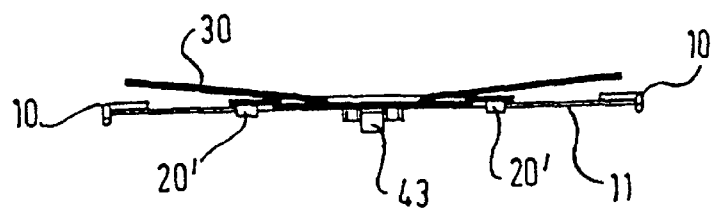
Figure 6:
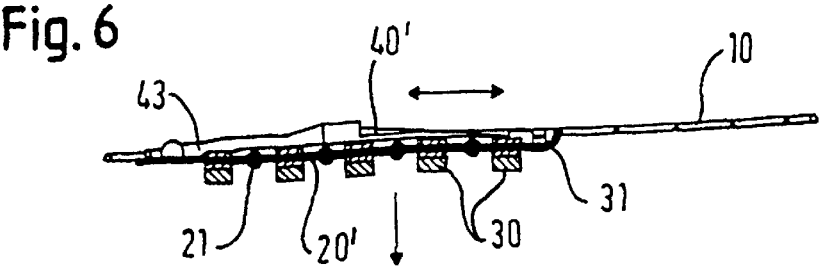
Figure 7:
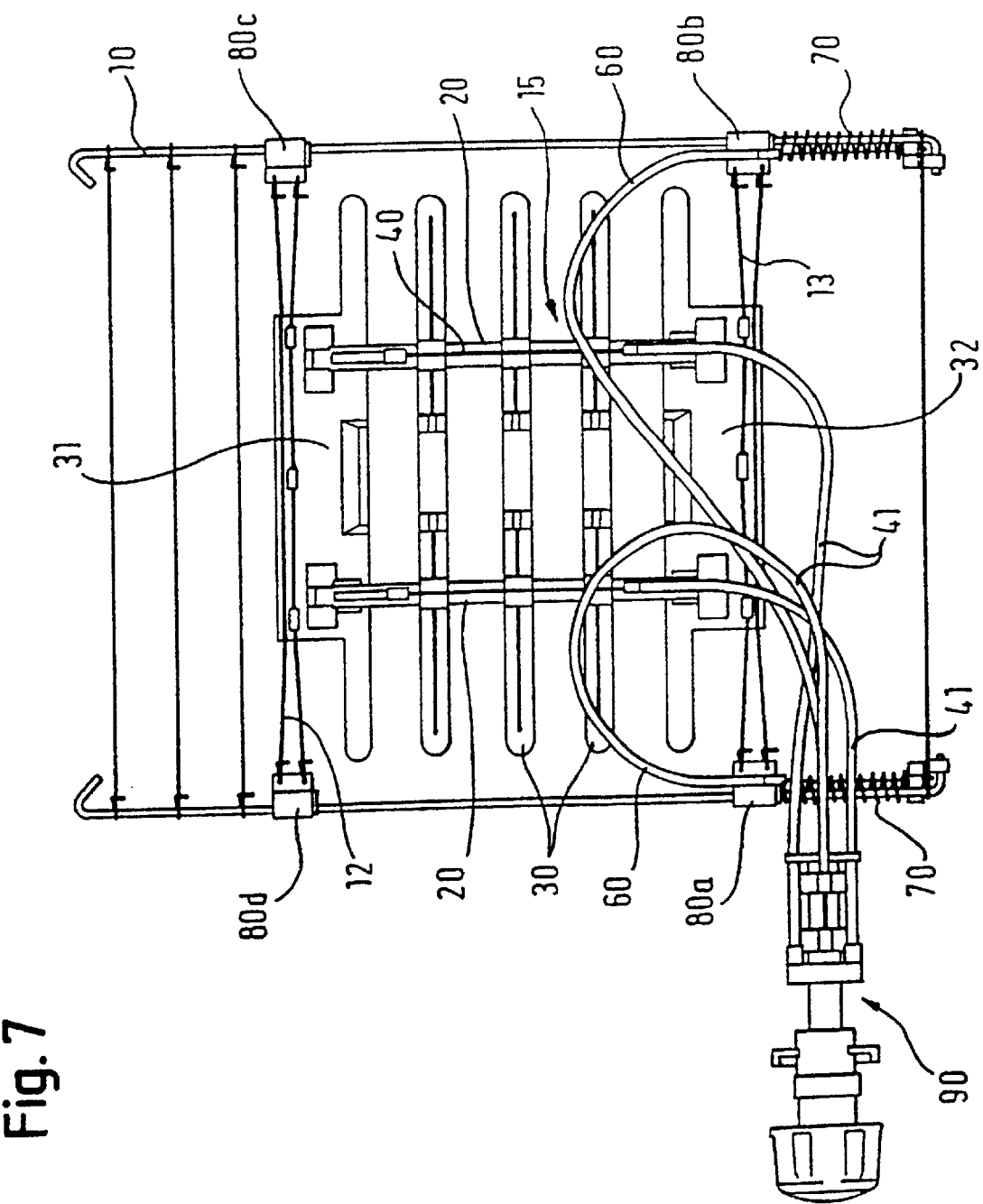

In the following detailed description presently preferred embodiments of the present invention are described with reference to the drawing which shows:

FIG. 1: A top view of the spine support according to a first preferred embodiment of the present invention;

FIG. 2: a section along the line A—A in FIG. 1;

FIG. 3: a section along the line B—B in FIG. 1;

FIG. 4: a top view of the spine support according to a second preferred embodiment of the present invention;

FIG. 5: a section along the line A—A in FIG. 4;

FIG. 6: a section along the line B—B in FIG. 4;

FIG. 7: a further preferred embodiment with the additional feature of a height adjustment of the spine support.

Figure 8:
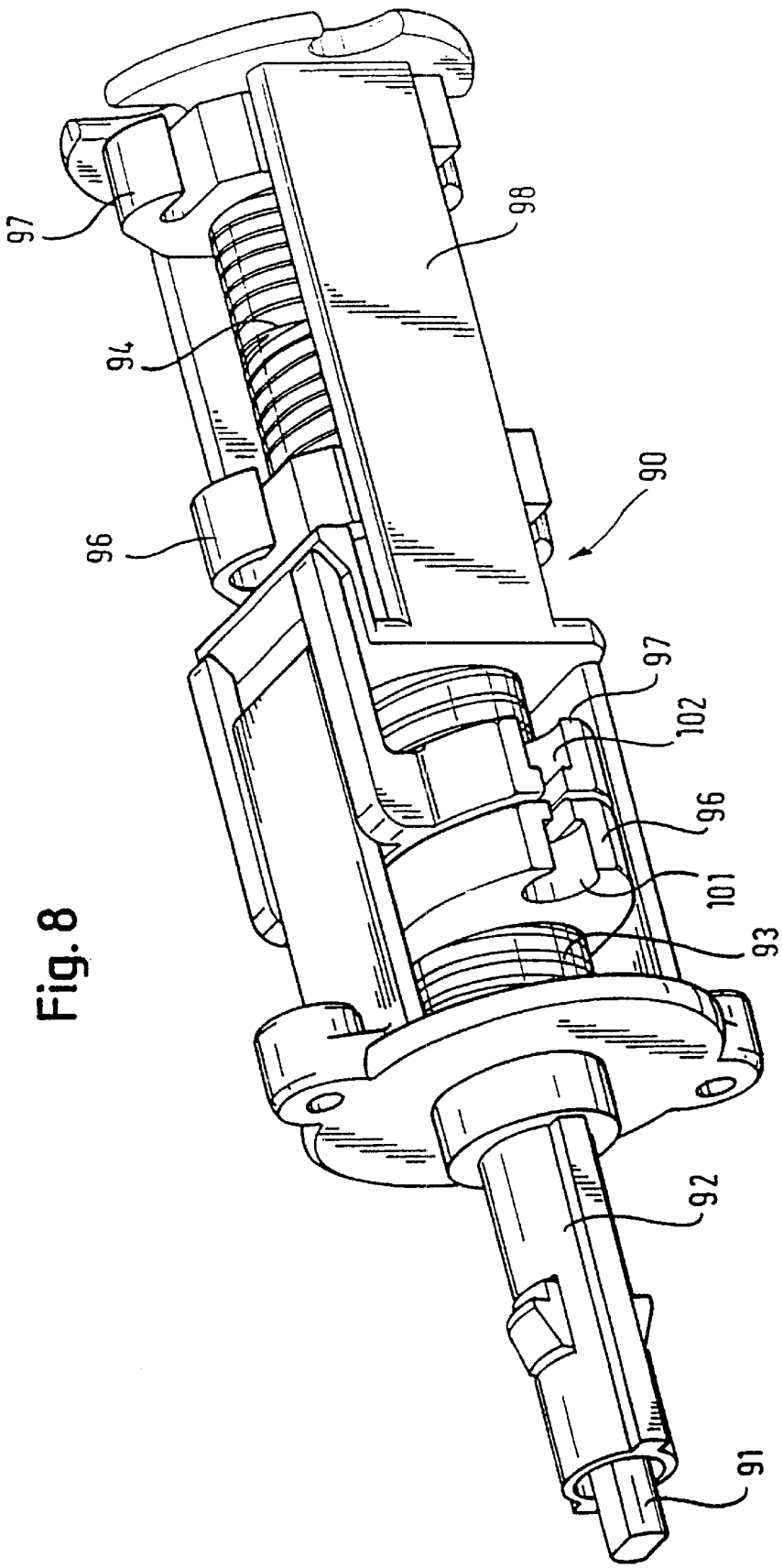
Figure 9:
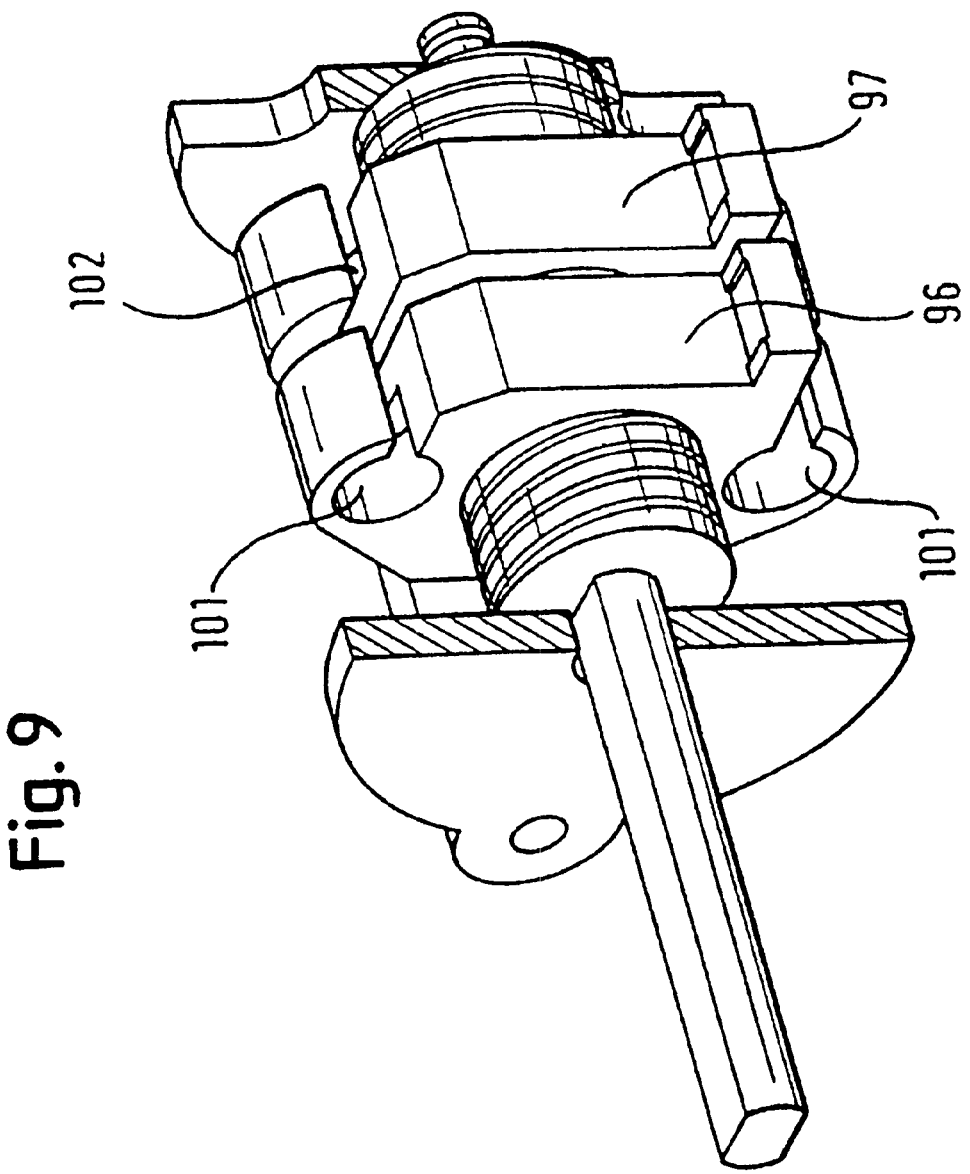

FIG. 8: a preferred control unit for adjusting the arch and the vertical position of a spine support;

FIG. 9: a detailed view of a part of the control unit of FIG 8; and

Figure 10:
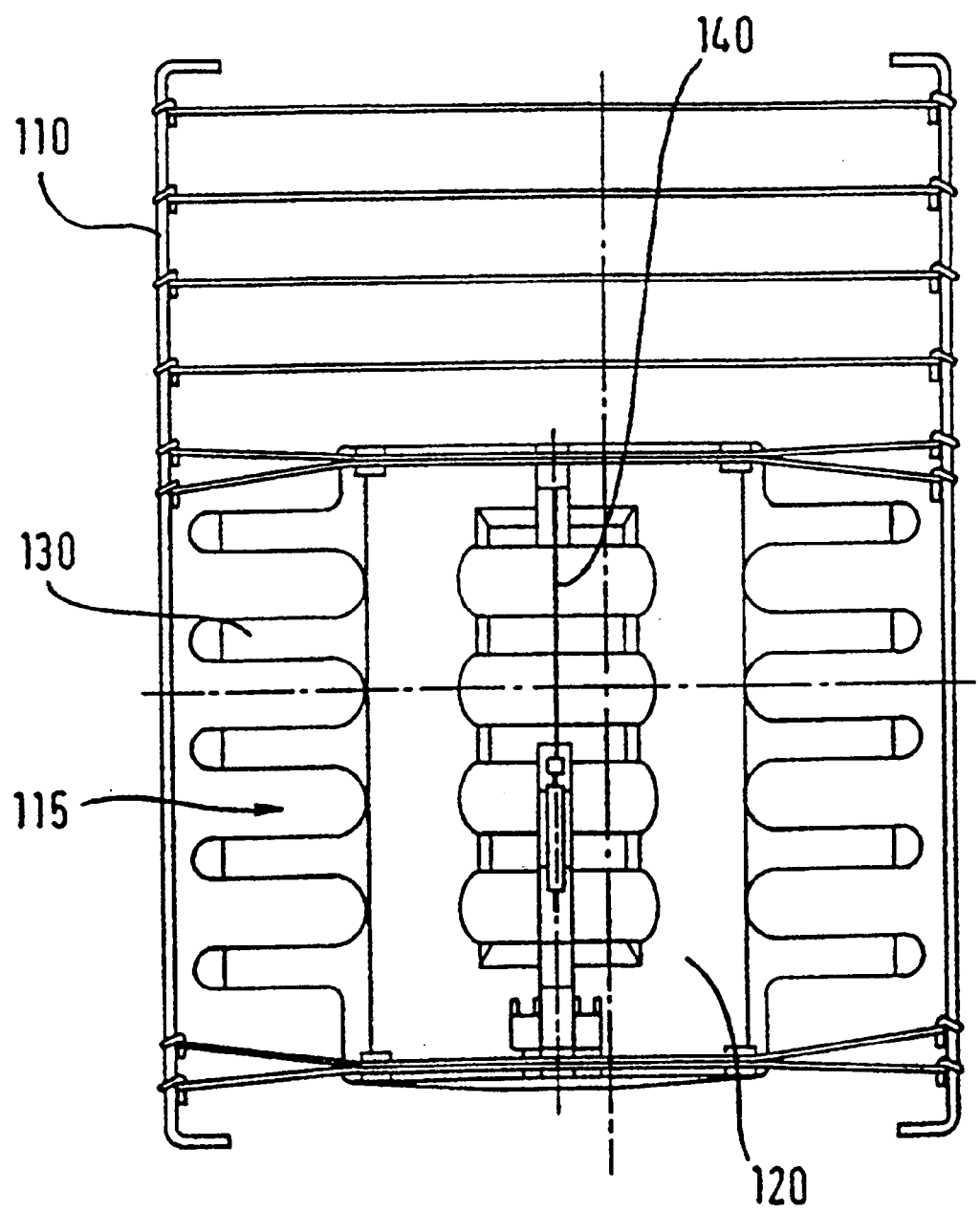

FIG. 10: a spine support according to the prior art.

DETAILED DESCRIPTION OF THE INVENTION

With reference to FIG. 1, the spine support according to a preferred embodiment comprises preferably a frame 10 and an adjusting device 15 suspended in the lower part of the frame 10 to adjust the spine support. The fame 10 consists of two rods connected by several steel cables 11 or the like. The frame 10 is together with the adjusting device 15 mounted below the cushioning of the backrest of a seat, in particular the seat of a car (not shown) to support the cushioning and to bring it into the desired shape. The two rods of the frame 10 are preferably mounted to the outer frame (not shown) of the seat by two short coil springs (not shown).

In the adjusting device 15 preferably two bending elements 20 or 20' (cf. FIG. 4) and preferably five supporting elements in the form of laths 30 are provided to form a framework which is flexible in vertical direction. Conceivable, however, are also other numbers of bending elements and laths. The two bending elements 20', 20 are preferably parallel arranged with respect to each other in a vertical direction and are connected by the horizontally arranged laths 30. In the preferred embodiment shown in FIG. 1 the two bending elements comprise preferably coil springs which are preferably covered by a plastic material for corrosion protection (not shown).

The laths 30 extend over the almost complete width of the frame 10 and have preferably a slight V-shape (cf. FIG. 2) to provide a bucket seat. The connections between the laths 30 and the bending elements 20 are preferably achieved by essentially semicircular connecting elements 25 (cf. FIG. 2) extending around the coil springs 20 and mounted to the flat upper side of the lath 30. According to a further embodiment (not shown) the two bending element have a varying distance from each other. Preferably the distance is greater in the center of the spine support than at its ends in order to optimize the adaptation to the spine of the person sitting on the seat. The laths 30 may either consist of wood (in this case the connecting elements, consisting preferably of a plastic material, are bolted or clipped onto the lath) or of a plastic material (in this case the connecting elements might be integrally molded together with the laths).

A first end plate 31 is preferably mounted to the center of the top most lath 30. On this end plate 31 a connecting element 42 is arranged to which the end of the first operating element, i.e. a bowden cable 40, is connected. The connection between the bowden cable 40 and the connecting element 42 is preferably achieved by attachment screws, welding, or the like.

Preferably in the center of a second endplate 32 arranged on the lowest lath an oblong support 43 is mounted extending approximately to the intermediate lath. On this support 43 the end of the cover 41 of the bowden cable is mounted.

The present spine support according to the invention operates as follows: A pulling of the bowden cable 40 causes the endplate 31 on the top most lath and the endplate 32 on the lowest lath to approach each other (see the horizontal arrow in FIG. 3). This is only possible, if at the same time the two bending elements 20 bend like an arch over the plane defined by the frame 10 (cf. vertical arrow in FIG. 3). The laths 30 which are orthogonally to the bending elements 20 arranged provide an annular vault or arch over the complete lower part of the frame.

The support 43, flexibly mounted with its lower end to the second end plate 32, remains as well as the bowden cable 40 in the plane of the frame 10. The bending of the arch is limited by the end of the cover 41 of the bowden cable 40 which is in the starting position arranged approximately at the intermediate lath.

To obtain an arch which differs in its shape from a segment of a circle and which is better adapted to the anatomical requirements for supporting the spine, the stiffnesses of the two bending elements are preferably selectively increased by reinforcing elements 26. The preferred arrangement of four reinforcing elements 26 between the two upper and the two lower laths provides a smaller radius of curvature in the intermediate part of the arch than in the upper and lower parts. If a different modification of the arch is intended, the reinforcing elements can be arranged in different sections of the two bending elements 20.

The second preferred embodiment of the spine support shown in the FIGS. 4 to 6 differs from the embodiment described above essentially by the type of bending elements 20. Corresponding elements have the same reference numerals. Instead of the coil springs several short rods 20' are used which are connected by hinges 21 (cf. FIG. 6). The arch of the spine support is in this embodiment obtained by tilting the separate short rods 20' with respect to each other. Thus, approximately an arch is created. Since in this case no elastic bending takes place, the mechanical strain on the material of the bending elements 20' is reduced. The hingedly connected rods 20', however, do in contrast to the coil springs 20 not provide a restoring moment so that instead of a simple bowden cable 40 which can only transmit pulling forces, a more stable "push/pull cable" 40' is used which can also transmit pushing forces for moving the top-most and the lowest lath 30 away from each other to bring the arched spine support back into its original flat shape.

In a further embodiment shown in FIG. 7 two bowden cables 40 are provided extending parallel to the bending elements 20. Similar to the embodiments of the FIGS. 1 and 4 the ends of the two bowden cables 40 are mounted to the upper endplate 31 and the corresponding covers are mounted to the lower endplate 32. For adjusting the arch the two bowden cables 40 are either manually or electrically simultaneously operated preferably by the control 90 described below.

In the embodiment shown in FIG. 7 an additional height adjustment for the spine support is provided. Whereas in FIG. 1 and in FIG. 4 the first endplate 31 and the second endplate 32 are for the suspension of the adjusting device 15 rigidly connected to the frame 10 via two steel cables 12, 13 or the like, the embodiment shown in FIG. 8 comprises four sliding blocks 80a, 80b, 80c, 80d to which the mentioned steel cables 12, 13 are mounted and which slide along the rods on the side of the frame 10. Conceivable is also an embodiment where the sliding blocks do not slide but roll along the rods. Thus, the complete adjusting device 15 may be moved upwards and downwards along the rods of the frame 10.

For the control of this movement a second operating element is provided, preferably a further pair 60 of bowden cables. The cover of each of the cables 60 is mounted to the lower sliding block 80a, 80b, respectively, whereas the inner steel cables are fixed to the lower end of the corresponding rod of the frame 10. By operating the two bowden cables 60, the complete adjusting device 15 is downwardly pulled against the resistance of the two coil springs 70. In the opposite case, that is, if the tension in the bowden cables 60 is released, the adjusting device 15 is upwardly pushed by the two coil springs 70.

Instead of a compression of the coil springs 70 it is also possible that the coil springs 70 are mounted above the lower sliding blocks 80a, 80b at the rods of the frame 10 so that a downward movement of the adjusting device 15 does not lead to a compression but to an expansion of the coil springs 70. Further, it is also possible to use other elastic elements instead of the coil springs 70, for example sleeves made out of an Elastomer (not shown). Finally, the coil spring 70/elastic elements may also act upon the upper sliding blocks 80c, 80d.

For the adjustment of the arch of the spine support and for the adjustment of the vertical position, a pair of bowden cables 40, 60, respectively, has to be operated. To this end two axles 91, 92 are preferably arranged in a control unit 90 (cf. FIG. 8), i.e. the axle 91 is arranged inside the hollow axle 92. Both axles 91, 92 terminate in two threaded areas 93 and 94 arranged one after the other. A rotation of the outer axle 92 leads to a rotation of the threaded area 93 and a rotation of the inner axle 91 leads to a rotation of the threaded area 94.

The threaded areas 93 and 94 are each separated into two parts having in one half right-handed threads and in the other half left-handed threads (cf. FIG. 9). On the one half a receiver 96 for the ends of the two inner steel cables (not shown) of the bowden cables 40 or the bowden cables 60 are provided, on the other half a receptacle 97 for the two corresponding outer covers (not shown) of the respective bowden cables is provided. Each of the receivers 96 has two slit eyes 101 into which the end of the respective two steel cables are to be arranged. In the receptacles 97 corresponding recesses 102 are provided for receiving the two outer covers of the bowden cables 40, 60, respectively.

Due to the left- and right-handed threads in the two halves of the threaded areas 93, 94 the distance between a receiver 96 and the corresponding receptacle 97 is under a rotation of one of the axles increased or decreased, depending on the direction of the rotation. Thus, one of the two pairs of bowden cables 40, 60 is tightened or released. Alternatively, either the receiver 96 or the receptacle remains fixed 97 on the axle, so that a change of the distance is achieved by moving only one of the two part along the axle.

The two threaded areas 93, 94 are surrounded by a housing 98 (cf. FIG. 8) which provides a bearing for the two axles 91, 92. The housing further avoids that under a rotation of one of the axles 91, 92 the corresponding receiver and/or the corresponding receptacle 97 rotates instead of moving back and forth on the corresponding axles.

The axles can either be manually driven or by at least one electric motor (not shown). For a manual adjustment two turning knobs (cf. FIG. 7) are arranged at the ends of the two coaxial axles. The control unit 90 is in this case preferably arranged in the lower part of the backrest to allow an easy adjustment of the spine support during use.

In case of an electric drive preferably two motors (not shown) are used turning each one of the axles 91, 92. Depending on the type of motor an additional gear is needed. Conceivable is also the use of a single motor adjusting at first the arch and subsequently the vertical position of the spine support.

Furthermore, if the electric motor(s) is/are electronically controlled, it is possible to store a certain shape and position of the spine support. This is in particular useful in car seats, since in this case the seat can be individually adjusted to the driver presently using the car by a simple command to the electronics.

To reduce the weight of the spine support, almost all of the above described parts are preferably made out of a stable plastic material, preferably polyamide No. 6. Only the coil springs 20, which are subjected to considerable strain are preferably made out of metal, preferably spring steel. For the bowden cable 40 and the push/pull cable 40', respectively, preferably a steel cable is used and for the cover 41 preferably a spiral wire covered with polypropylene. The components of the control unit 90 are preferably made out of polyamide No. 6 or metal.

We claim:

1. Adjustable spine support, in particular for a car seat, comprising
    a. at least one bending element (20, 20');
    b. a plurality of supporting elements (30), which are essentially orthogonally arranged on the at least one bending element (20) and which are connected to it;
    c. at least two Bowden cables (40, 60) arranged such that the operation of the first Bowden cable (40) causes a bending of the at least one bending element (20) and that the operation of the second Bowden cable (60) causes a vertical adjustment of the spine support, wherein
    d. the first and the second Bowden cable (40, 60) are operated by a control unit (90) with two coaxially arranged axles (91, 92), which comprise each a section with opposed threads (94) having a receptacle (96) for an inner steel cable and a support (97) for an outer sheath of the corresponding Bowden cable (40) arranged thereon so that under a rotation (91, 92) of one of the axles (91, 92) the distance between the corresponding receptacle (96) and the corresponding support (97) is, depending on the direction of the rotation, decreased or increased.

2. Adjustable spine support according to claim 1 where the at least one bending element (20, 20') comprises a coil spring.

3. Adjustable spine support according to claim 2 comprising two vertical bending elements (20, 20') where the plurality of supporting elements (30) consist of lath-like elements connected with the two bending elements (20, 20') to form a flexible framework.

4. Adjustable spine support according to claim 3, where the two bending elements (20, 20') have a different distance from each other in the center of the spine support than at its ends.

5. Adjustable spine support according to claim 3 where reinforcing elements (26) are arranged around the bending elements (20) to influence the bent shape of the bending elements (20).

6. Adjustable spine support according to claim 3 where the first Bowden cable (40) is essentially parallel arranged to the two bending elements (20, 20'), where the end of the Bowden cable (40) is mounted to the top most lath-like element (31) and where the sheath is mounted to the lowest lath-like element (32) so that an operation of the Bowden cable (40) causes the top most and the lowest lath-like element to approach each other under a simultaneous bending of the two bending elements (20, 20').

7. Adjustable spine support according to claim 6, where the bending elements (20, 20') and the lath-like elements (30) are height adjustably suspended in the frame (10) by at least one sliding block (80) which can be upwardly and downwardly moved with a second Bowden cable (60) in the frame (10).

8. Adjustable spine support according to claim 7 where the at least one sliding block (80) is downwardly pulled by the second Bowden cable (60) under a simultaneous action on at least one restoring element (70) and where the sliding block is under a release of the tension in the second Bowden cable (60) upwardly pushed by the at least one restoring element (70).

9. Adjustable spine support according to claim 1 where the at least one bending element (20) consists of hingedly connected rods (20').

10. Adjustable spine support according to claim 1 where the two axles (91, 92) are manually rotated.

11. Adjustable spine support according to claim 10 where the two axles (91, 92) are rotated by at least one electric motor.

12. Adjustable spine support according to claim 11 where the at least one electric motor is electronically controlled so that an adjusted arch and a vertical position of the spine support can be stored.

* * * * *